Sept. 3, 1968 T. L. WADLEY ET AL 3,400,336
DEVICE FOR SELECTING SIGNALS OF A SELECTED FREQUENCY IN RELATION TO GROUPS OF HARMONIC FREQUENCIES
Filed Feb. 13, 1967
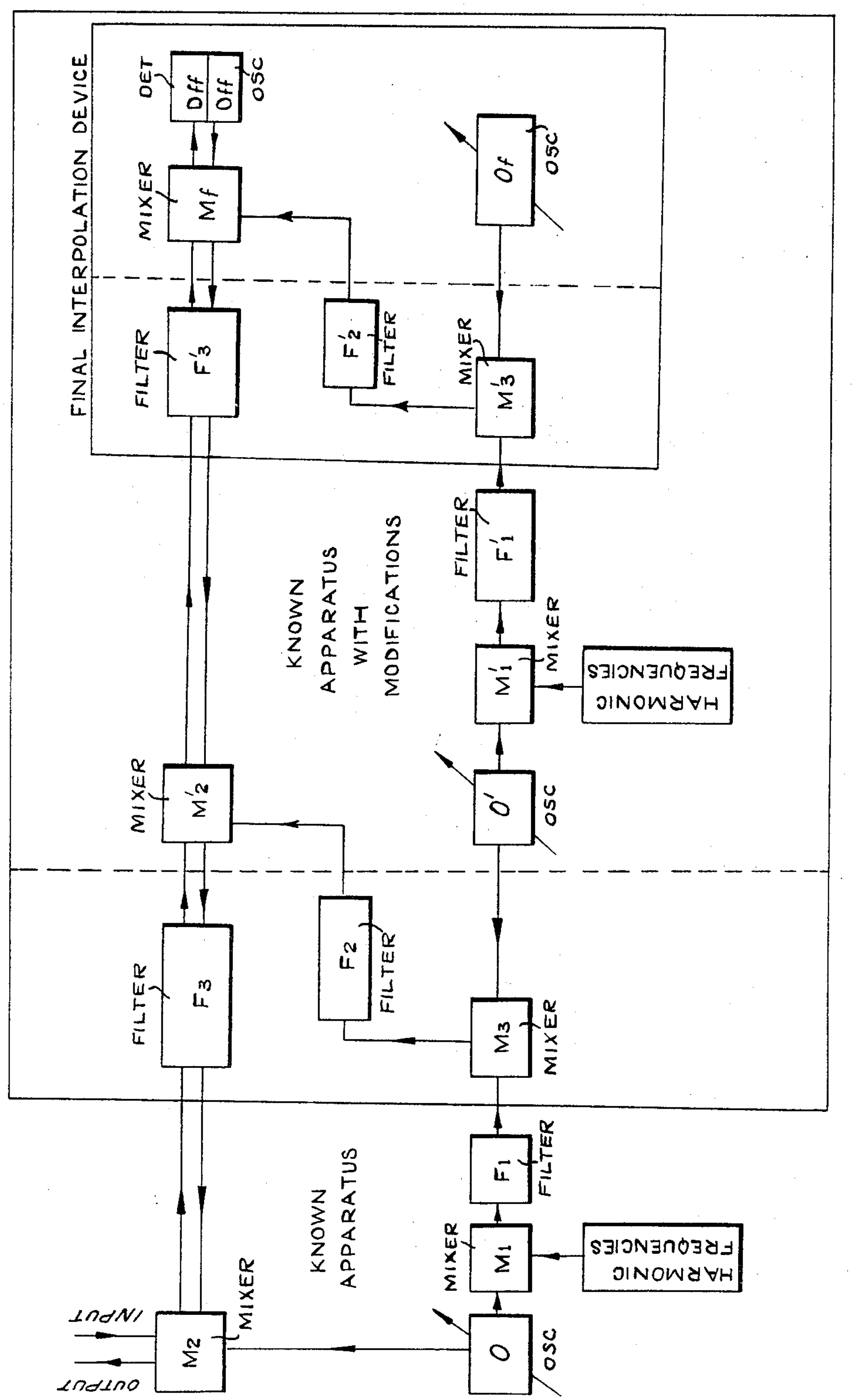

United States Patent Office 3,400,336

Patented Sept. 3, 1968

3,400,336

DEVICE FOR SELECTING SIGNALS OF A SELECTED FREQUENCY IN RELATION TO GROUPS OF HARMONIC FREQUENCIES

Trevor L. Wadley, Warner Beach, Natal, Republic of South Africa, assignor to Racal-S.M.D. Electronics Pty. Limited, Pretoria, Republic of South Africa Filed Feb. 13, 1967, Ser. No. 615,615
Claims priority, application Republic of South Africa, Feb. 18, 1966, 66/917
2 Claims. (Cl. 331—38)

ABSTRACT OF THE DISCLOSURE

An electronic device for generating or receiving electrical signals of a desired frequency with a high degree of selectivity by relating the generated or received signal to groups of harmonic frequencies. The selectivity is increased by interpolating between the harmonic frequencies. For purposes of flexibility the interpolation circuit is substantially the same as the part of the circuit preceding the interpolation circuit.

This invention relates to devices for the selection of frequencies. More particularly it relates to devices for detecting or generating signals of a selected frequency in relation to groups of harmonic frequencies.

The present invention is closely related to certain known apparatus of the type mentioned above. Such known apparatus is described in the specification of British Patent No. 714,684. It consists basically of two separate but inter-connected circuits, the second circuit being an interpolation device for determining the frequency of the signal, which is detected or generated by the whole device, relative to one of the harmonic frequencies. This known arrangement is illustrated in the drawing accompanying the present specification from which it will be seen that the first circuit comprises a first bandpass filter F1, a variable frequency oscillator O, the input frequencies to the first filter F1 being generated in a first mixer M1 which is excited by the harmonic frequencies, and by the variable oscillator O, the output of the first filter F1 consisting in the sum or difference of the frequency of the variable oscillator O and one of the group of harmonic frequencies, and the variable oscillator O also exciting a second mixer M2 to which the signals to be detected are applied or from which the generated signals are obtained. The second mixer M2 and the output of the first filter F1 are then connected to the interpolation device.

It is an object of the present invention to render the above-mentioned known apparatus more flexible.

Broadly speaking this is achieved by making the interpolation device correspond to the first circuit, except for certain modifications.

According to the invention therefore the second circuit is the same as the first circuit except that it is designed to operate at a lower order of frequency than the first circuit and that it is modified for use as an intermediate interpolation device, in that its variable frequency oscillator, instead of exciting its second mixer, excites a third mixer which is also excited by the output of the first bandpass filter of the first circuit, the output of the third mixer is fed to a third filter the output of which is fed to its second mixer replacing the connection between its variable frequency oscillator and its second mixer, and that its second mixer is connected to the second mixer of the first circuit through a fourth bandpass filter.

Further according to the invention the first bandpass filter of the second circuit and the second mixer of the second circuit are connected to a final interpolation device which is the same as the second circuit except that it is designed to operate at a lower order of frequency than the second circuit and that it is modified for interpolation use in that its second mixer feeds a fixed frequency detector or is fed by a fixed frequency oscillator, and that its variable frequency oscillator excites its third mixer with its first bandpass filter and its first mixer being omitted.

To illustrate the invention an embodiment thereof is described with reference to the accompanying drawing which is a block schematic diagram.

In the accompanying drawing the second circuit or intermediate interpolation device is essentially the same as the first circuit in that it comprises a first bandpass filter F1′, a variable frequency oscillator O′, a first mixer M1′ which is excited by the whole group of harmonic frequencies simultaneously and by the variable oscillator O′, and a second mixer M2′ to which the signals to be detected are applied or from which the generated signals are obtained. The differences between the second and first circuits are that, in the second circuit, the connection between the variable oscillator O′ and the second mixer M2′ is omitted, the variable oscillator O′ is arranged to feed a third mixer M3 which is also excited by the output of the first bandpass filter F1 of the first circuit, the output of the third mixer M3 is fed to a third filter F2 the output of which is fed to the second mixer M2′, and that the second mixer M2′ is connected to the second mixer M2 of the first circuit through a fourth bandpass filter F3. The second circuit is furthermore arranged to operate at a lower frequency than the first circuit.

In order to complete a system a final interpolation device is required. This may take the form of any interpolation device suitable for use with the known apparatus. A preferred method consists of a device according to the invention in which $M_3'$, $F_2'$ and $F_3'$ have a similar function at lower order of frequency as $M_3$, $F_2$ and $F_3$ but in which the final mixer $M_f$ corresponding to $M_2$ feeds a fixed frequency detector $D_{ff}$ or is fed by a fixed frequency oscillator $O_{ff}$ and in which the final oscillator $O_f$ is a variable oscillator whose frequency contributes directly to the selected frequency of the required signal, and interpolates continuously.

The fixed frequency oscillator may be replaced by a suitably processed signal for generating, for example, a single sideband signal.

Continuous interpolation may be obtained at any stage of the device, for instance at O′ by disconnecting $F_2'$ from $M_f$ and providing a suitable fixed frequency feed in its place. External oscillator feeds to any of the several oscillators may be provided from separate synthesisers or other devices, without any mechanical complications. Alternatively any of the oscillators may have their frequency voltage controlled without mechanical complication.

Due to its relative simplicity the signal path $M_2$, $F_3$, $M_2'$, $F_3'$, etc. may be readily duplicated to provide multiple channels of the same frequency, for instance, for direction finding purposes. Bilateral operation of the mixers $M_2$, $M_2'$, etc. will provide simplex transceiver operation in the same apparatus or with duplicated signal channels duplex operation may be provided by means of suitable sidesteps at any of the filtering frequencies.

By way of numerical example and to illustrate the manner in which the system may be built up in a logical numerical sequence filtering frequencies and oscillator coverages are given on the diagram.

The mixer $M_2$ may be preceded by the required radio frequency preselective circuits (or power amplifiers when generating) to give a coverage of 3 to 30 mc./s. The harmonic spectrum supplied to the harmonic mixer $M_1$ is based on a fundamental of 1 mc./s., the harmonics 2nd to 28th being used. The oscillator O covers 48.5 to 74.5 mc./s. and the appropriate harmonic is filtered by the harmonic filter $F_1$ with a centre frequency of 45.5 mc./s. and bandwidth of say 300 kc./s.

The first intermediate frequency filter $F_3$ has a bandpass 44.5 to 45.5 mc./s. plus a tolerance of say 300 kc./s.

The oscillator O′ has a coverage exactly one tenth of that of O namely 4.85 to 7.45 mc./s., and similarly the 2nd harmonic spectrum, and the centre frequencies of filters $F_1'$, $F_2'$, $F_3'$ are scaled down to one tenth of the frequency of the corresponding $F_1$, $F_2$, $F_3$. Thus the mixer $M_2'$ when excited directly by the oscillator O′ constitutes the input of a detecting device (or output of a generating device) corresponding exactly to the whole device but scaled down to cover the radio frequency range 300 kc./s. to 3 mc./s.

When interpolating in 100 kc./s. increments (or continuously) the oscillator O′ need only cover 5.550 to 6.550 mc./s. and the harmonics of 100 kc./s. from the 9th to the 18th are used, although if the previous filters are given sufficient tolerance this oscillator may be used outside this range to give overlaps to the 1 mc./s. bands on either side. This coverage corresponds to a coverage in the direct 300 kc./s. to 3 mc./s. function of 1 to 2 mc./s.

The oscillator O′ in conjunction with mixer $M_3$ and filter $F_2$ sidesteps the harmonic filter frequency 46.5 mc./s. to the band 40 to 41 mc./s. plus tolerance again say 300 kc./s., and this constitutes the local oscillator feed to the signal mixer $M_2'$ when the latter is interpolating. The second intermediate frequency $F_3'$ lying between 4.45 and 4.55 mc./s. is thus derived from the first intermediate frequency.

The final intermediate frequency $F_f$ is then made 455 kc./s. and of appropriate bandpass and the final oscillator $O_f$ has a coverage of 555 to 655 kc./s., unless it again is to perform the function of a still lower frequency device covering 30 to 300 kc./s. in which case its full coverage would be 485 to 745 kc./s. In similar manner the coverage may be extended downwards indefinitely in decaded steps. A final intermediate frequency may be taken out at any point in the signal path to suit the communication function involved. In the same manner a signal may be injected at any point in the signal path when the device is generating.

The coverage may be extended upwards to cover say 30 to 300 mc./s., the device as described covering 3–30 mc./s. providing the basis of the interpolating device required, and so on indefinitely.

The system is well adapted to panoramic display of bands of frequencies, which may be accurately indicated in terms of their frequencies. This may be achieved in a number of ways, for instance by sweeping the frequency of one of the interpolation oscillators, say O′, while the circuit is arranged for continuous interpolation at this oscillator, and displaying the final detected signal from the whole device. Alternatively if required to monitor a single channel in a band while displaying the whole band, the function of the whole device may be left unchanged, and a suitable panoramic detector arranged to display the content of any of the intermediate frequency outputs. A preferred method of doing this, is for example, to duplicate O′, $M_3$, $F_2$ and $M_2'$ and provide an additional suitable intermediate frequency filter and detector following ($M_2'$ duplicated) for the panoramic function.

An alternative numerical system and system of coverage may be based on frequency spans from 1 to 10 units, that is say 10 to 100 mc./s., 1 to 10 mc./s., 100 kc. to 1 mc./s. etc. In addition to providing alternative coverage which may be more suitable for some purposes, such a system would enable smaller units to be built as inductor efficiency need not be as high. Furthermore greater numerical simplicity is obtained in that in the interpolation function the equivalent direct coverage would be 0 to 1 mc./s. in the case of the 100 kc. to 1 mc./s. unit, and thus direct and interpolation scales may be identical. In this system more sophisticated filter circuits should be used as the ratio of bandpass to working frequency is higher. Furthermore more efficient screening of circuits is necessary as the variable oscillators pass through the intermediate frequencies, unless this limitation is acceptable on the grounds that the frequencies at which this occurs is duplicated on the scales, that is to say an interpolation of zero may be avoided by using say 1 mc./s. instead.

I claim:

1. A device for selecting electrical signals of a desired frequency in relation to groups of harmonic frequencies, of the type consisting of two separate but interconnected circuits; one circuit comprising a first bandpass filter, a variable frequency oscillator, the input frequencies to the first filter being generated in a first mixer which is excited by the harmonic frequencies and by the variable oscillator, the output of the first filter consisting in the sum or difference of the frequency of the variable oscillator and one of the group of harmonic frequencies, and the variable oscillator also exciting a second mixer, and means supplying an input signal to the second mixer; and the second circuit being an interpolation device connected to the second mixer and the output of the first filter for determining the frequency of the signal, which is selected by the whole device, relative to the frequency of one of the group of harmonic frequencies, the second circuit comprising a first bandpass filter, a variable frequency oscillator, the input frequencies to the first filter being generated in a first mixer which is excited by the harmonic frequencies and by the variable oscillator; a third mixer excited by the output of the first bandpass filter of the first circuit and the variable frequency oscillator of the second circuit, a second mixer in the second circuit, and a filter receiving the output signal of the third mixer and supplying an input signal to the second mixer of the second circuit, and a filter receiving the output signal of the second mixer of the first circuit and supplying an input signal to the second mixer of the second circuit.

2. A device as defined in claim 1 further including a pair of mixers and a variable frequency oscillator, one of said mixers being excited by said oscillator and the output of the first bandpass filter of the second circuit, a filter receiving the output of said one of said mixers and having an output exciting the other of said mixers, a bandpass filter connected to the output of the second mixer of the second circuit and having an output exciting the other of said mixers, and a detector fed by the output of the second mixer.

References Cited

UNITED STATES PATENTS 3,202,931 8/1965 Koontz ............ 331—39

FOREIGN PATENTS 714,684 9/1954 Great Britain.

ROY LAKE, *Primary Examiner.*

S. H. GRIMM, *Assistant Examiner.*